United States Patent

[11] 3,634,608

[72] Inventors Donald E. Buhl;
Donald R. Schuster, both of Columbus, Ohio
[21] Appl. No. 59,880
[22] Filed July 31, 1970
[45] Patented Jan. 11, 1972
[73] Assignee Westinghouse Electric Corporation
Pittsburgh, Pa.

[54] STRAIN RELIEF BUSHING
11 Claims, 6 Drawing Figs.
[52] U.S. Cl. .................................................... 174/153 G,
16/2, 248/56
[51] Int. Cl. .................................................... F16l 5/00
[50] Field of Search .......................................... 174/65 G,
152 G, 153 G; 16/2; 24/141, 142; 248/56; 339/103 B

[56] References Cited
UNITED STATES PATENTS
| | | | |
|---|---|---|---|
| 2,324,791 | 7/1943 | McLoughlin et al. | 174/153 G UX |
| 2,427,742 | 9/1947 | Peterson et al. | 174/153 G UX |
| 3,141,062 | 7/1964 | Rapata | 174/153 G |

Primary Examiner—Laramie E. Askin
Attorneys—F. H. Henson, E. C. Arenz and R. B. Farley ABSTRACT: The invention provides a strain relief bushing which is utilized to grip a wire conductor passing through a panel member or the like, with the bushing inserted in an aperture in the panel or in a slot contained therein and firmly gripped by its edges to compress the wire conductor so that the bushing resists any tensile pull placed on the conductor. The bushing includes further provision for means for receiving an additional overlapping panel member.

FIG. 1

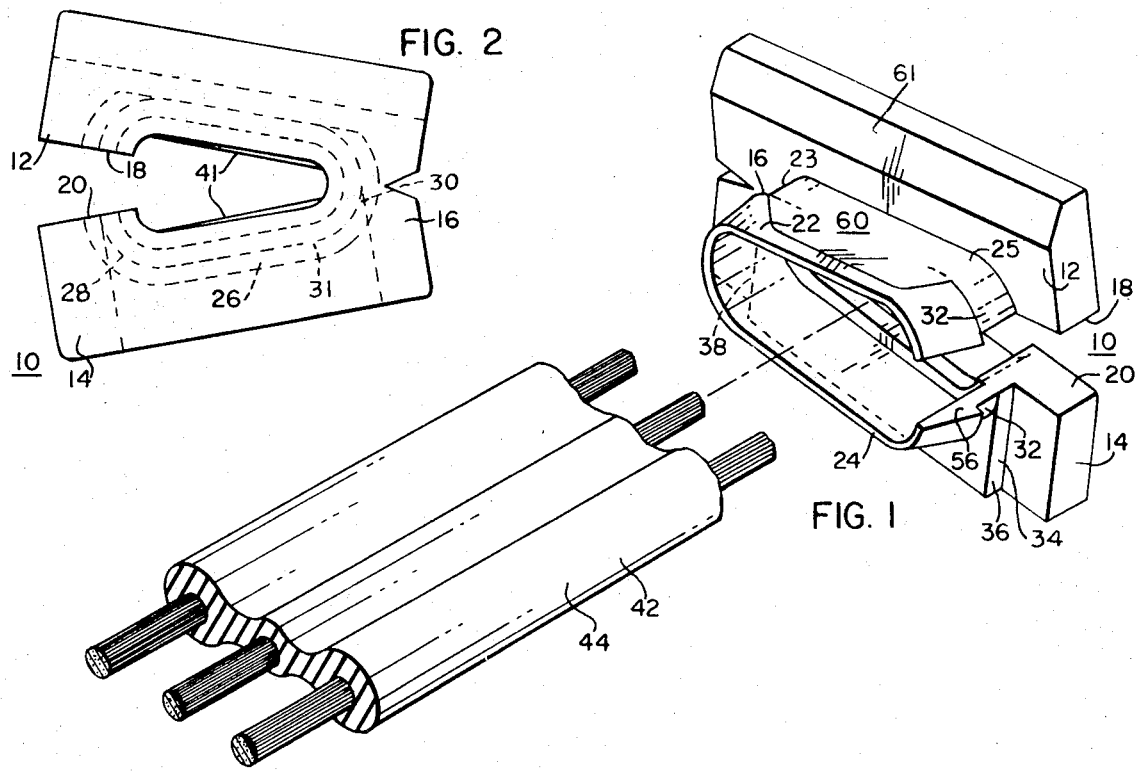
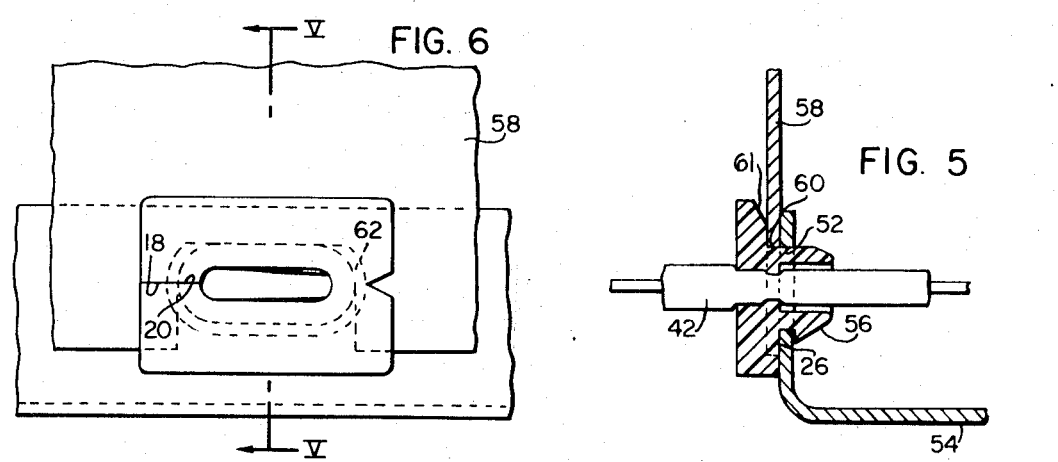
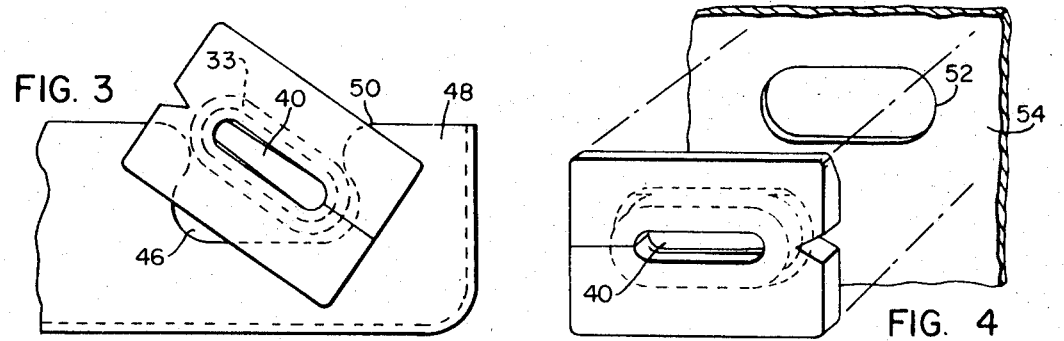

STRAIN RELIEF BUSHING

BACKGROUND OF THE INVENTION

1. Field of the Invention

The invention relates to strain relief bushings or grommets and, more particularly, relates to such a strain relief bushing or grommet which may be utilized with a plurality of panels which engage with it.

2. Description of the Prior Art

The use of strain relief grommets or bushings for the gripping of a wire or the like passing through an apertured workpiece so as to prevent the imposition of tensile forces past the grommet or bushing and so that the grommet or bushing provides a protection for the wire conductor that prevents the shorting of the wire conductor against the metal panel through which it extends is old and well known. Such bushings or grommets have heretofore been provided with opposed sections which may be snapped through an aperture contained in a metal panel or the like, with these two sections bearing down frictionally against the wire conductor so as to hold it securely and to prevent a tensile force imposed on a portion of the wire conductor on one side of the grommet or bushing from imposing a like force on the other side of the wire conductor. Such a grommet or bushing has additionally provided a shoulder arrangement which is disposed on the side of the metal plate which is in visual contact so that a decorative bezel effect is provided by this shoulder as it covers the edges of the aperture or slot through which the wire conductor extends. Additionally, such strain relief grommets or bushings, although normally designed so as to be utilized for passing a wire conductor or the like through an aperture in a plate in which they are mounted, could be utilized nearly as advantageously in a slot arrangement in a metal plate through which the conductor passed. However, none of the known prior art grommets or bushings have contemplated in their use that more than a single panel member might be present at their desired location for the passage of a wire conductor so that no special provisions have been made in their construction for the reception of an additional overlapping portion of a second panel.

In the design and development work on air-conditioning units, primarily small window-type air-conditioning units, it has been found advantageous to place the wire conductor for the establishing of an electric power supply to the interior of the air-conditioning cabinet structure adjacent the bottom portions of the unit. The use of a grommet or bushing with the wire conductor passing into the unit at this location, however, has been somewhat difficult based on the fact that the wrapper or cover for the unit and the base panel for the unit merge in this location, with the base panel generally taking the configuration of a right angle, in cross section, at its termination so as to provide a reinforcing and fastening means for the wrapper or cover which it overlaps.

Accordingly, it would be advantageous to provide a grommet or bushing strain relief member which could accommodate the merging of the two mentioned panels of an air-conditioning unit and further, one which would offer structural provision for the reception of these two panel elements.

SUMMARY OF THE INVENTION

The invention provides a strain relief bushing or grommet comprising a pair of opposed sections which are hingedly connected together along adjacent sides so that the opposed sections may be compressed around a wire conductor or the like to thereby prevent tensile stress imposed at one end of the wire conductor from being transmitted to the other end when the grommet or bushing has been mounted in a metal panel or the like. The strain relief bushing includes a substantially rectangular portion (in deformed, compressed condition) which provides a decorative bezel that covers the aperture or slot in which the strain relief bushing is mounted so that the visual face of the panels and bushing is a pleasing one. Disposed inwardly of this rectangular shoulder is a substantially oval-shaped flange (compressed condition) which is adapted to grippingly engage the wire conductor passing through the bushing so as to securely hold it in an assembled relation with the strain relief bushing. Tapered ribs are also provided within the confines of the oval-shaped flange to aid in gripping of the wire conductor. The strain relief bushing, on the outer periphery of the oval-shaped flange, also includes a substantially oval groove which extends around three sides of the ovallike flange, leaving the top side of the oval shape as a substantially flat surface with no groove. This groove is the means utilized for holding the strain relief bushing within the sheet metal plate in which it is inserted, with the walls of the sheet metal plate bordering the mounting aperture entering into this groove on its three formed sides. A notch is disposed at the outer termination of the strain relief bushing portion which provides a hinged portion to prevent fracturing of the bushing when it is clamped to the wire conductor, this notch thereby serving as a strain relief for the bushing assembly. Disposed at the bottom of the bushing, and mounted on the inside face of the shoulder portion is an integral pad member which provides a spacing for the second sheet metal panel which may be utilized with the strain relief bushing. This pad member is substantially one-half the thickness of the width of the peripheral groove so that mounting the bushing within a first panel member automatically provides clearance in the sides of the oval groove for the reception of the termination of the second panel. Because the top flange of the ovallike shape has no groove, a substantially large bearing surface is provided for resting of the second panel on the top of the strain relief bushing.

The described strain relief bushing, then, may be utilized advantageously by inserting the ovallike flange portion within an aperture extending through a metallic plate or by rolling the same into a notch formed in the said metallic plate. A second metallic plate then may be slid down over the top portion of the strain relief bushing to rest on the oval flange so that this bushing can advantageously be used in a location where there is an overlapped arrangement between two metallic panels or the like. The bushing, of course, may also be utilized with only one metallic panel, if desired.

DESCRIPTION OF THE DRAWINGS

For a better understanding of the invention, reference may be had to the preferred embodiment, exemplary of the invention, shown in the accompanying drawings, in which FIG. 1 is an exploded perspective view of the wire conductor and decorative strain relief bushing of the instant invention;

FIG. 2 is a front elevational view of the strain relief bushing:

FIG. 3 is a front elevational view of the strain relief bushing being rolled into a notch in a panel member;

FIG. 4 is a front view of the strain relief bushing and an apertured panel in which the bushing is to be inserted;

FIG. 5 is a cross-sectional view of the strain relief bushing inserted in a panel member and with a second panel member disposed in overlapping relation with a first panel member; and FIG. 6 is a front elevational view of the arrangement illustrated in FIG. 5.

DESCRIPTION OF THE PREFERRED EMBODIMENT

According to the principles of my invention, a strain relief bushing 10 is shown in FIGS. 1–6 having a pair of opposed portions 12 and 14 which are joined at their terminations forming a hinge portion 16. The hinge portion 16 is the only attachment means holding the opposed portions 12 and 14 together and, as seen in FIG. 2, these two portions extend in an acute angle relative to each other in their uncompressed state. In a compressed state (e.g., FIG. 6) the opposed portions 12 and 14 are in abutting relationship and includes faces 18 and 20 which are disposed in confronting and abutting relationship to form a substantially rectangular configuration for the strain relief bushing 10 when viewed from the front.

The opposed portions 12 and 14, also each include a generally rectangular outline when viewed from the front, and have attached thereto at their rears semiovular or semielliptical sections 22 and 24 extending axially inwardly relative to the rectangular opposed portions 12 and 14. The sections 22 and 24 are approximately of a thickness or width which is double that of the said opposed portions. The semiovular section 22 is the upper of these two sections and includes grooved portions 23, 25 which are formed at the extremities of the semiovular section 22, with these grooved portions being approximately one-half of the width of the semiovular section 22 and one-half the depth. The semiovular section 24 includes a groove 26 extending completely around its periphery so as to provide two side grooved portions 28 and 30 at its extremities joined to a bottom grooved portion 31, with these grooved portions being approximately one-half of the thickness and depth of the semiovular section 22 along its long upper section so that the grooved portions 23, 25, 28, 30 and 31 provide a groove 32 extending around all but the topmost portion of the ovular or elliptical flange 33 formed by semiovular sections 22, 24 when the strain relief bushing 10 is in a compressed condition. The groove 32, formed by the grooved portions, has a width that is dependent upon the thickness of the base panel at the bottom portion of the groove and dependent upon the base panel thickness and overlapping panel thickness at the end or radiused portions of the bushing (FIG. 1).

Below the semiovular section 22, a spacing pad 34 is disposed, as an integral part of the strain relief bushing 10 located against the rectangular back face of opposed portion 14. It extends inwardly therefrom into the groove 26 for a distance equal to the thickness of the overlapping panel plus a small clearance and also extends laterally to the bottom edge of the opposed portion 14 and linearly the full lineal extent of the groove 26. Spacing pad 34 includes straight sides 36 and 38 which are terminated at their lower extent at the bottom wall of opposed portion 14 so that the spacing pad 34 covers the entire area between the bottom of the opposed portion 14 and the semiovular section 24 in the area of grooved portions 28, 30 and 31. The purpose of this pad will be described in detail somewhat later in this specification.

The strain relief bushing 10, in compressed condition, includes an oval or elliptical hole 40 which is provided by the inner boundary or periphery of the semiovular sections 22 and 24. Oval hole 40 is utilized for the reception of an insulated wire conductor 42 which may be passed through the hole 40 prior to the compression of the opposed portions 12 and 14 in or to abutting relationship with each other and before strain relief bushing 10 is placed in its inserted position. In order to provide an even more secure attachment between strain relief bushing 10 and insulated wire conductor 41 a pair of tapered ribs 41,41 are provided within oval hole 40. These ribs have a thickness axially of the oval hole 40 of approximately 0.05 inch and extend mediate the thickness of strain relief bushing 10, beginning in a plane drawn through the frontmost extent of the grooved portions 23, 25, 26, 28 and 30 and extending forwardly therefrom to terminate within the oval hole 40 considerably short of its front termination. Each of the tapered ribs 41 tapers from the closed end of the strain relief bushing smoothly and continuously towards the open end of the strain relief bushing, the taper terminating slightly short of the termination of oval hole 40. Thus, an extremely high leverage is applied to the hinge 16 of the strain relief bushing when it is placed in closed condition and this leverage is imparted to the wire conductor 42 as a positive holding force. Of course, the insulated wire conductor 42 may be easily adjusted by being linearly slid through the hole 40, prior to compression of strain relief bushing 10 because of the enlarged condition of this hole and prior to the strain relief bushing 10 being placed in an aperture or slot formed in a metal plate with which it is used. Once the strain relief bushing 10 has been placed in its compressed condition, the sides of the strain relief bushing forming the hole 40 and the ribs 41, 41 compressingly encompass the wire conductor 42 and its insulating sheet 44 so as to securely hold the insulated wire conductor 42 and prevent the imposition of tensile forces on one side of the wire extending from the strain relief bushing 10 from being passed through the insulated wire conductor into the other side thereof.

The strain relief bushing 10 may be disposed in an elongated slot 46 provided in a metal sheet or panel 48 (FIG. 3), with this slot having substantially the shape of the semiovular sections 22 and 24 in compressed condition but also including an upwardly opening portion 50 through which the strain relief bushing 10 can be rollingly passed so as to be compressingly held within the major portion of elongated slot 46. As is illustrated in the drawings the strain relief bushing 10 is inserted in metal panel 48 by being placed with one end of the bushing (the end not containing the hinge portion 16) within the slot 46, with the main portion of the strain relief bushing 10 extending outwardly of the slot 46 at an angle. The strain relief bushing is then rolled or cammed and, at the same time, forced downwardly through the opening 50 so that the end of the strain relief bushing at the hinged portion 16 engages against the wall of the slot 46 opposite the wall of the slot against which the strain relief bushing was first abutted.

FIG. 4 shows a strain relief bushing 10 in compressed condition just prior to its reception to an aperture 52 disposed in a metal sheet or panel 54. The aperture 52 has substantially the same dimensions and shape of the semiovular sections 22 and 24 when in compressed condition, only slightly smaller. Thus, the strain relief bushing 10 is engaged by the sides of the aperture 52 in its groove 32 so as to hold in firmly within the aperture 52 (FIG. 5). A taper 56 extends from the inward termination of the semiovular sections 22 and 24 and increased therefrom as one moved towards the groove 32 to provide an alignment and entrance means to permit the easy insertion of the strain relief bushing 10 into the oval like aperture 52. Prior to the insertion of the strain relief bushing 10, of course, the insulated wire conductor 42 is placed therein and the bushing compressed to as great an extent as possible. The leading edge of the taper 56 of the strain relief bushing 10 is then inserted into the aperture 52 and the strain relief bushing further compressed and moved inwardly into the aperture 52 until the groove 32 of the strain relief bushing abuts against the walls forming the aperture 52.

FIGS. 5 and 6 specifically illustrate the strain relief bushing 10 when utilized with a pair of overlapping metal panels or the like. The panel 54, having the aperture 52, is first joined to the strain relief bushing 10 as described above. This places the groove 32 into abutting relationship with the walls of the aperture 52. However, the spacing pad 34 insures that the side groove portions 23, 25, 28 and 30 include a clearance space at their forwardmost extent for the reception of an overlapping panel 58. A clearance and seating space is also provided at the topmost portion of the semiovular section 22 in the peripheral area of this section where no groove is located. This provides a face 60 for the abutting, seating engagement of the panel 58. Also, a tapered portion 61 is provided on the rear side of opposed portion 12 to provide a lead-in or entrance angle for the panel 58.

Panel 58 includes a notched portion 62 having substantially the same shape but a greater depth than the semiovular section 22 so that the panel 58 may seat on the face 60, with portions of the panel extending into grooved portions 23, 25, 28 and 30. The notch 62 thereby provides a downwardly opening substantially U-shaped configuration to permit easy insertion of the strain relief bushing 10 into the sheet metal panel 58. As can be best seen in FIG. 6 this provides an arrangement whereby a pair of panels 58 and 48 may be overlapped as is conventional, for example, in the lower portions of window air-conditioner cabinets. At the same time, the strain relief bushing 10 and its inwardly extending wire conductor 42 are also positioned very low relative to the bottom portion of a metal panel so that the wire conductor 42 is conveniently placed relative to the entire outer shell enclosure of the air-conditioning unit.

An alternate method of mounting the strain relief bushing 10 with the panels 54 and 58 may also be utilized. This involves the assembly of these two panels together and the insertion of the strain relief bushing into both of these panels at the same time.

It should be clear from the foregoing description that a strain relief bushing or grommet has been provided which may be utilized to advantageously securely hold a wire conductor extending therethrough with the grommet or bushing inserted in a metal panel or the like by means of an aperture or groove formed in the panel. Further, it should be specifically pointed out that the described grommet or bushing also provides an arrangement whereby an additional overlapping panel may be utilized in the assemblage and this second panel also assembled with the strain relief bushing. It should also be clear to one skilled in the art that many modifications can be made in the described arrangement without departing from the spirit or scope of the foregoing disclosure. For example, both the first and second panels could utilize notched slots and, yet, they both could be assembled to the strain relief bushing in the instant invention.

We claim:

1. A strain relief bushing and panel means including:
   a. a pair of opposed portions on said strain relief bushing,
   b. an integral hinge portion connecting said opposed portions,
   c. said opposed portions including peripheral groove means,
   d. a spacing means solely provided on one of said opposed portions for reducing the effective width of at least a segment of said peripheral groove means on said one of said opposed portions, at least a part of said peripheral groove on the other of said opposed portions being wider than said segment,
   e. said spacing means positively locating a portion of said panel means extending into said segment, other portions of said panel means extending into the wider part of said peripheral groove means.

2. The strain relief bushing and panel means of claim 1 wherein:
   a. each of said opposed portions includes a shoulder means, and
   b. each of said shoulder means providing a decorative bezel.

3. The strain relief bushing and panel means of claim 2 wherein:
   a. each of said shoulder means is rectangular.

4. The strain relief bushing and panel means of claim 1 wherein:
   a. said opposed portions are capable of assuming a compressed abutting position,
   b. in said compressed position, said strain relief bushing includes an aperture of generally elliptical shape.

5. The strain relief bushing and panel means of claim 4 wherein:
   a. said strain relief bushing in compressed condition includes a flange means extending axially relative to said aperture, and
   b. said flange means includes said peripheral groove means disposed therein.

6. The strain relief bushing and panel means of claim 5 wherein;
   a. termination of said groove means provides a space on said flange, and
   b. said space is substantially flat for forming a seating means for at least a part of said other portions of said panel means.

7. The strain relief bushing and panel means of claim 5 wherein:
   a. said flange means is tapered,
   b. said taper provides for ease in insertion of said strain relief bushing in said other portions of said panel means.

8. A strain relief bushing and panel means assembly including:
   a. a pair of opposed portions on said strain relief bushing,
   b. an integral hinge portion connecting said opposed portions,
   c. said opposed portions including peripheral groove means,
   d. a spacing means provided on one of said opposed portions,
   e. said spacing means positively locating a first panel means relative to the width of said peripheral groove means, said first panel means extending into said peripheral groove means,
   f. said groove means extending only partially around said pair of opposed portions, and
   g. a second panel means seating on said strain relief bushing in the area thereof having no groove means.

9. The combination of a strain relief bushing and a pair of overlapping panel means including:
   a. a first panel means having an aperture means,
   b. said strain relief bushing disposed in said aperture means,
   c. said strain relief bushing including groove means and spacer means,
   d. a second panel means disposed in at least a portion of said groove means and positioned therein by said spacer means.
   e. said strain relief bushing including shoulder means disposed outwardly of said groove means and contiguous to said second panel means, and
   f. one of said shoulder means including a vertical tapered portion for providing an angulated lead in for said second panel means.

10. The combination of a strain relief bushing and a pair of overlapping panel means including:
    a. a first panel means having an aperture means,
    b. said strain relief bushing disposed in said aperture means,
    c. said strain relief bushing including groove means and spacer means.
    d. a second panel means disposed in at least a portion of said groove means and positioned therein by said spacer means,
    e. said strain relief bushing including an aperture means,
    f. conductor means extending through said aperture means, and
    g. tapered rib means disposed adjacent said aperture means for providing a compressive force on said conductor means.

11. A strain relief bushing for use with panel means including:
    a. a pair of opposed portions,
    b. an integral hinge portion connecting said opposed portions,
    c. said opposed portions including peripheral groove means,
    d. said peripheral groove means having a narrower segment on one of said opposed portions than on the other of said opposed portions, said narrower segment being present solely on said one of said opposed portions,
    e. whereby said peripheral groove means provides a groove means of varying width for selective mounted spacing with said strain relief bushing.

* * * * *